(12) United States Patent
Moore et al.

(10) Patent No.: US 10,812,471 B1
(45) Date of Patent: *Oct. 20, 2020

(54) BANK SPEECH AUTHENTICATION

(71) Applicant: UNITED SERVICES AUTOMOBILE ASSOCIATION, San Antonio, TX (US)

(72) Inventors: Richard E. Moore, San Antonio, TX (US); Hector J. Castillo, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/407,092

(22) Filed: May 8, 2019

Related U.S. Application Data

(63) Continuation of application No. 15/967,127, filed on Apr. 30, 2018, now Pat. No. 10,298,566, which is a continuation of application No. 15/652,087, filed on Jul. 17, 2017, now Pat. No. 10,003,594, which is a continuation of application No. 14/826,702, filed on Aug. 14, 2015, now Pat. No. 9,712,522, which is a
(Continued)

(51) Int. Cl.
*H04L 29/06* (2006.01)
*G06Q 20/10* (2012.01)
*G06Q 40/02* (2012.01)

(52) U.S. Cl.
CPC ......... *H04L 63/083* (2013.01); *G06Q 20/108* (2013.01); *G06Q 40/02* (2013.01)

(58) Field of Classification Search
CPC .... G06F 21/602; G06F 17/5045; G06F 21/72; G06F 2217/66; G06F 2221/2111; G09C 1/00; H04L 9/002; H04L 2209/04
See application file for complete search history.

(56) References Cited

U.S. PATENT DOCUMENTS 1,922,879 A 8/1933 Burgener
2,685,614 A 8/1954 Curtin
(Continued)

OTHER PUBLICATIONS

O'Goman et al., "Comparing passwords, tokens, and biometrics for user authentication", Proceedings of the IEEE, vol. 91 , Issue: 12 , Dec. (Year: 2003).*
(Continued)

*Primary Examiner* — Morshed Mehedi
(74) *Attorney, Agent, or Firm* — Fletcher Yoder, P.C.

(57) ABSTRACT

Authentication mechanisms are disclosed. For example, an enterprise associated number or a social security number (SSN) can be provided to enter a first level. Then, any one of a ZIP code number, a device identifier, a date of birth, and a portion of the SSN can be provided to access applications in the first level. Lastly, a PIN can be provided to enter a second level of the enterprise. Additionally, these authentication mechanisms can be added and/or changed. In the former case, if a user used a SSN to enter the mentioned first level, then a date of birth can be used to update an authentication mechanism. Alternatively, if a user used an enterprise number to gain such access, then part of the SSN can be used for the update. If the user wants to change the authentication mechanism, the date of birth can be used for the update.

18 Claims, 6 Drawing Sheets

Related U.S. Application Data continuation of application No. 14/172,472, filed on Feb. 4, 2014, now Pat. No. 9,111,075, which is a continuation of application No. 11/829,080, filed on Jul. 26, 2007, now Pat. No. 8,646,045.

(56) References Cited

U.S. PATENT DOCUMENTS

| | | | |
|---|---|---|---|
| 2,863,950 A | 12/1958 | Dunning et al. | |
| 2,892,038 A | 6/1959 | Gatzert | |
| 2,985,721 A | 5/1961 | Gatzert | |
| 2,998,489 A | 8/1961 | Riesz | |
| 3,141,931 A | 7/1964 | Zarouni | |
| 3,146,310 A | 8/1964 | Jeffries et al. | |
| 3,197,566 A | 7/1965 | Sanders et al. | |
| 3,273,260 A | 9/1966 | Walker | |
| 3,296,371 A | 1/1967 | Fox | |
| 3,510,598 A | 5/1970 | Ballin et al. | |
| 3,519,745 A | 7/1970 | Colman | |
| 3,728,486 A | 4/1973 | Kraus | |
| 3,733,440 A | 5/1973 | Sipes | |
| 3,920,908 A | 11/1975 | Kraus | |
| 4,117,270 A | 9/1978 | Lesea | |
| 4,200,772 A | 4/1980 | Vicari et al. | |
| 4,210,783 A | 7/1980 | Vicari et al. | |
| 4,256,928 A | 3/1981 | Lesea et al. | |
| 4,272,810 A | 6/1981 | Gates et al. | |
| 4,302,632 A | 11/1981 | Vicari et al. | |
| 4,320,256 A | 3/1982 | Freeman | |
| RE30,903 E | 4/1982 | Vicari et al. | |
| 4,371,752 A | 2/1983 | Matthews et al. | |
| 4,625,081 A | 11/1986 | Lotito et al. | |
| 4,941,168 A | 7/1990 | Kelly, Jr. | |
| 5,388,150 A | 2/1995 | Schneyer et al. | |
| 5,465,286 A | 11/1995 | Clare et al. | |
| 5,475,748 A | 12/1995 | Jones | |
| 6,263,447 B1* | 7/2001 | French | G06F 21/31 380/30 |
| 7,076,458 B2* | 7/2006 | Lawlor | G06Q 20/04 705/35 |
| 7,284,062 B2 | 10/2007 | Krantz et al. | |
| 7,835,721 B2* | 11/2010 | Tuulos | H04L 63/105 455/410 |
| 8,060,744 B2* | 11/2011 | O'Brien | G06F 12/1491 713/166 |
| 8,365,254 B2* | 1/2013 | Burke | G06F 21/604 726/21 |
| 8,646,045 B1 | 2/2014 | Moore et al. | |
| 9,111,075 B1 | 8/2015 | Moore et al. | |
| 9,712,522 B1 | 7/2017 | Moore et al. | |
| 10,003,594 B1 | 6/2018 | Moore et al. | |
| 2002/0087894 A1* | 7/2002 | Foley | H04L 63/083 726/4 |
| 2002/0138377 A1 | 9/2002 | Weber | |
| 2002/0184538 A1 | 12/2002 | Sugimura et al. | |
| 2005/0149759 A1* | 7/2005 | Vishwanath | G06F 21/121 726/4 |
| 2005/0165914 A1 | 7/2005 | Moore et al. | |
| 2005/0197859 A1 | 9/2005 | Wilson et al. | |
| 2006/0020530 A1 | 1/2006 | Hsu et al. | |
| 2006/0053285 A1 | 3/2006 | Kimmel et al. | |
| 2007/0168283 A1* | 7/2007 | Alvarez | G06Q 20/1085 705/43 |
| 2008/0066167 A1* | 3/2008 | Andri | G06F 21/46 726/5 |
| 2009/0037728 A1* | 2/2009 | Kamikura | H04L 9/3263 713/156 |

OTHER PUBLICATIONS

Everitt et al., "Java-based Internet biometric authentication system", IEEE Transactions on Pattern Analysis and Machine Intelligence, vol. 25, Issue: 9, Sept. (Year: 2003).*

Independent journalist, "Common authentication—reducing risk and raising customer service," ACI Worldwide, downloaded Aug. 7, 2007, 1-3.

Rolfe, A., "Out-of-Band Authentication Protects Online Financial Data," Ecommerce Times, 2007, downloaded Aug. 7, 2007, http://www.ecommercetimes.com/story/55570.html, 4 pages.

Bank Systems & Technology, Smart Cards: Providing Secure and Strong Authentication Over Insecure Public Networks,: Banking eMail Platform, http://www.baktech.com, 2004, downloaded Aug. 7, 2007, 3 pages.

British Computer Society, "Friend or Foe?" http://www.bcs.org/server/php?show=con WebDoc. 10906, 2007, downloaded Aug. 2007, 1-5.

"The Emperor Has No Clothes: Recognizing the Need for Biometrics for Phone Security," FST / Nuance, http://www.usfst.com/pastissue, downloaded Aug. 7, 2007, 2 pages.

"Store & Forward Voice Switching", International Resource Development, Inc., Report #145, pp. 45-56, Jan. 1980 . . . .

"A Design Model for a Real-Time Voice Storage System", Hattori et al., IEEE Trans. on Communications, vol. COM-30, No. 1, Jan. 1982, pp. 53-57 . . . .

Barish, Bernard T. and Slattery, Paul J., "BISCOM: Rx for Internal Communications", Bell Laboratories Record, vol. 42, No. 6, pp. 175-180 (Jun. 1974) . . . .

Watson, Jr., R. E and S. B. Weinberg, "Telephone Answering Services," Bell Laboratories Record, vol. 43, No. 12, pp. 447-450 (Dec. 1965) . . . .

Liske, W., "Remote Controlled Switching of the Telephone Message Service of the Deutsche Bundespost," TN-Nachrichten vol. 70, pp. 13-16 (1970) . . . .

Probe Research, Inc., "ECS Telecommunications, Inc.," Proceedings of Voice Processing Seminar, Sep. 15, 1982 . . . .

Probe Research, Inc., "Voice Message Service," Proceedings of Voice Processing Seminar, Sep. 15, 1982 . . . .

Probe Research, Inc., "Logic Labs, Inc." Proceedings of Voice Processing Seminar, Sep. 15, 1982 . . . .

Probe Research, Inc., "BBL Industries, Inc.," Proceedings of Voice Processing Seminar, Sep. 15, 1958 . . . .

Probe Research, Inc., "Wang Laboratories," Proceedings of Voice Processing Seminar, Sep. 16, 1982 . . . .

Probe Research, Inc., "American Telephone and Telegraph, Inc.," Proceedings of Voice Processing Seminar, Sep. 16, 1982 . . . .

Probe Research, Inc., "Commterm, Inc.," Proceedings of Voice Processing Seminar, Sep. 16, 1982 . . . .

Probe Research, Inc., "American Express Company," Proceedings of Voice Processing Seminar, Sep. 16, 1982 . . . .

Probe Research, Inc. "Equitable Life Assurance," Proceedings of Voice Processing Seminar, Sep. 16, 1982 . . . .

Probe Research, Inc., "Massachusetts General Hospital," Proceedings of Voice Processing Seminar, Sep. 16, 1982 . . . .

Seaman, John, "Electronic Mail Coming at You," Computer Decisions, pp. 129-160 (Oct. 1982) . . . .

"Voice Mail Update," Electronic Mail & Message Systems, vol. 4, No. 20 (Oct. 15, 1980) . . . .

Hanson, Bruce L., R. J. Nacon and D. P. Worrall, "Custom Calling Features Cater to Customers," Telephony, pp. 28-32 (Sep. 1980) . . . .

"Elect. Mail Pack Unveiled by DEC." Electronic News, vol. 27, No. 1365 (Nov. 21, 1981) . . . .

ECS Telecommunications, Inc. Marketing Literature for their UMX System (Jan. 7, 1982) . . . .

Memo from C. W. Murphy to Jack Atkin Dated Jan. 30, 1981 . . . .

"ECS Unveils 1,000-User Digital Message Exchange," Communications . . . .

Matthews, G. H., "The Pitfalls of Small Telecommunications Trunk Groups," ECS Telecommunications, Inc, (1981) . . . .

"New Product, Voice Message Systems," Business Communications Review pp. 37-40 (Jan.-Feb. 1981) . . . .

Dukes, A., "IBM Unveils Voice Mailbox; Seen as Step Toward PBX," MIS Week, vol. 2, No. 39 (Sep. 30, 1981) . . . .

"Speechfile—IBM's Secret Message System Weapon," Electronic Mail & Message Systems, vol. 5, No. 12 (Jun. 15, 1981) . . . .

(56) References Cited

OTHER PUBLICATIONS

"Introducing Voice Store & Forward," Computer Decisions, (Oct. 1981) . . . .
Out Voice Product Brochures, Voice and Data Systems, Inc . . . .
Dukes, A., "Atlanta Firm Enters Voice-Message Arena," Management Information Systems Week, p. 6 (Nov. 18, 1981) . . . .
"New Local Net, Voice Store and Forward from Wang," Computer Decisions (Aug. 1981) . . . .
Delphi Delta 1 Telephone Operator's Training Manual (Apr. 1, 1981) . . . .
Delphi Delta 1 Voicebank Data Entry Reference Manual (Jul. 20, 1981) . . . .
Delphi Delta 1 Voicebank Marketing Literature . . . .
Delphi Delta 1 Specification . . . .
Delphi Delta 1 Standard Processor Module (SPM-1) Specification (Mar. 13, 1978) . . . .
Delphi Pascal Programmers Manual (May 22, 1981) . . . .

\* cited by examiner

BANK SPEECH AUTHENTICATION

CROSS REFERENCE TO RELATED APPLICATIONS

This application is a continuation application of U.S. patent application Ser. No. 15/967,127, filed Apr. 30, 2018, which is a continuation application of U.S. application Ser. No. 15/652,087, filed Jul. 17, 2017, which is a continuation of U.S. patent application Ser. No. 14/826,702, filed Aug. 14, 2015, which is a continuation of U.S. patent application Ser. No. 14/172,472, filed Feb. 4, 2014, which is a continuation of U.S. patent application Ser. No. 11/829,080, filed on Jul. 26, 2007, each of which is hereby incorporated by reference in its entirety.

This application is also related to subject matter disclosed in the following commonly assigned application: U.S. patent application Ser. No. 11/829,081, filed Jul. 26, 2007, entitled "Systems and Methods For User Authentication," which is hereby incorporated by reference in its entirety.

BACKGROUND

A plurality of authentication mechanisms exist in the art. Some are based on user input of user identification and/or password, others are based on documentation, such as providing a driver's license or a credit card, and still others are based on biometrics, including iris scans, fingerprints, and so on. Such authentication mechanisms may grant users access to various levels of a given enterprise. For example, when users call banks, they may have to provide a personal identification number (PIN) to check the balance of their savings account. However, this single mechanism, and others like it, is insecure since users tend to pick PINs that can be easily hacked (or, alternatively, they may forget their PINs and/or disable this feature altogether when accessing an enterprise). In fact, none of the mechanisms in the art are arranged and structured in such a way as to leverage the strong aspect of each individual mechanism while minimizing the weak aspect thereof. Thus, what is needed are sound authentication mechanisms that are built on a plurality of other mechanisms in such a way as to leverage the strong aspects of each of the plurality of other mechanisms while minimizing the weak aspects.

SUMMARY

Authentication mechanisms are disclosed that are built on a plurality of other mechanisms in such a way as to leverage the strong aspects of each of the plurality of other mechanisms while minimizing the weak aspects. For example, in one aspect of the presently disclosed subject matter, various levels of an enterprise require various valid authentication information to be inputted by users. By way of example and not limitation, either an enterprise-associated number or a social security number may be provided to the enterprise to enter an enterprise prompt. Then, any one of a ZIP code number, a device calling/contacting number, a date of birth, and a portion of the social security number may be provided to access applications in a first level of the enterprise. Lastly, a personal identification number (PIN) may be provided to enter a second level of the enterprise, where various transactions may be performed, such as transferring funds, making payments, and changing security information.

In another aspect of the presently disclosed subject matter, authentication mechanisms may be added and/or changed. By way of example and not limitation, in the case of adding an authentication mechanism, if a user used a social security number to enter the mentioned first level of the enterprise, then a date of birth may be used to update an authentication mechanism. Alternatively, if a user used an enterprise number to gain such access, then part of the social security number may be used for the update. In still other aspects, if the user wants to change the authentication mechanism, the date of birth may be used for the update. Various other aspects are also disclosed in the Detailed Description, including how authentication mechanisms flags are detected and set, how notifications are sent, and how enterprise representatives may be contacted in an otherwise automated system. Thus, in other aspects disclosed herein, a secure system is provided in which the security level of enterprise entry may be set by the users themselves (vis-à-vis a system where the enterprise determines security levels).

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed or shown. The following figures are included.

DETAILED DESCRIPTION

Figure 1:
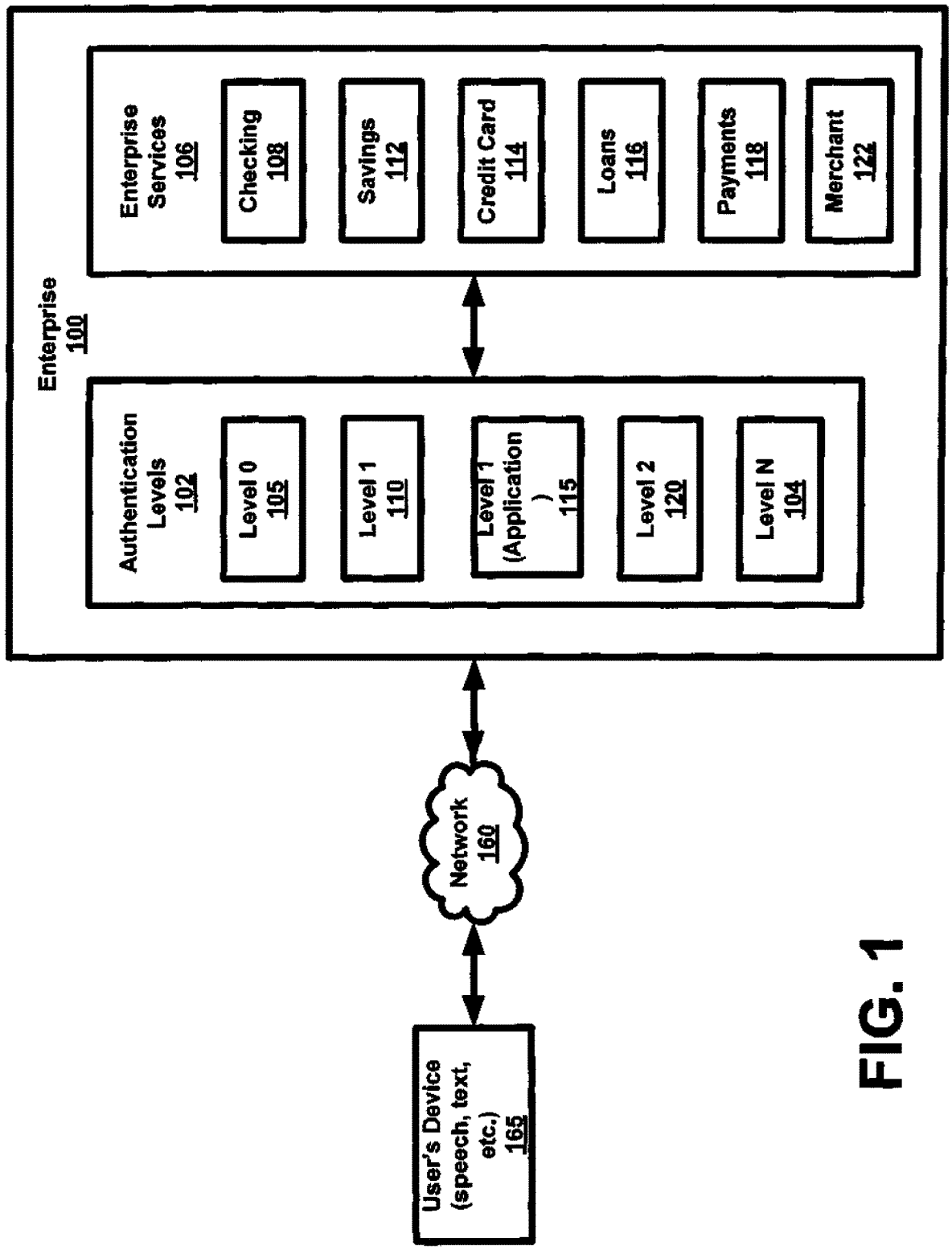
FIG. 1 illustrates various authentication levels and various enterprise services associated therewith.

Various systems, methods, computer readable media, and the like are provided for authentication of users. For example, FIG. 1 illustrates various authentication levels and various enterprise services associated with these levels. Given an enterprise 100, disclosed in one exemplary and non-limiting aspect of the present disclosure, a user can try to gain access to this enterprise 100 in order to obtain some enterprise services 106. Before the user actually gains access, the user may pass through various authentication levels 102.

Thus, in a typical scenario, the user may contact the enterprise 100 by using a device 165, such as a telephone, a computer (whether mobile or stationary), a personal digital assistant (PDA), and the like. The selection of the device 165 may dictate the medium for communication. If the device 165 is a telephone, the medium for communication may be speech; if the device 165 is a desktop computer, the medium for communication may be text; and so on. Alternatively, in one exemplary aspect of the present disclosure, if the enterprise 100 is set up to communicate in a speech medium but the device 165 naturally communicates in a different medium, various conversion modules may be used (e.g., text-to-speech or speech-to-text, and so on).

In any event, the user can communicate with the enterprise 100 via some network 160. The network 160 may be a wide area network (WAN), a local area network (LAN), a plain old telephone service (POTS), and the like. In one exemplary aspect of the present disclosure, when the user first enters the enterprise 100, the user may enter level 0 105. At this level 105, the user may be greeted and prompted to select a line of business associated with the enterprise 100. The line of business may correspond to the various enterprise services 106 the enterprise 100 provides, such as checking 108, savings 112, credit card 114, loans 116, payments 118, merchant-related services 122, and the like.

Next, the user may enter a more privileged state in the enterprise, such as level 1 110. At this level 110, the user may choose to make payments, enter a PIN number (if one has been set), and so on. To use specific applications at this level, such as checking the user's available balance of funds, recent activity, etc., the enterprise 100 may require additional authentication. Further still, if the user wants to engage in higher-level transactions, such as transferring funds, making payments, changing security settings (e.g., PINs), the user may have to be authenticated to gain access to a level 2 120. As is shown in FIG. 1, there may be a plurality of such levels of authentication, extending to a level N 104.

Figure 2:
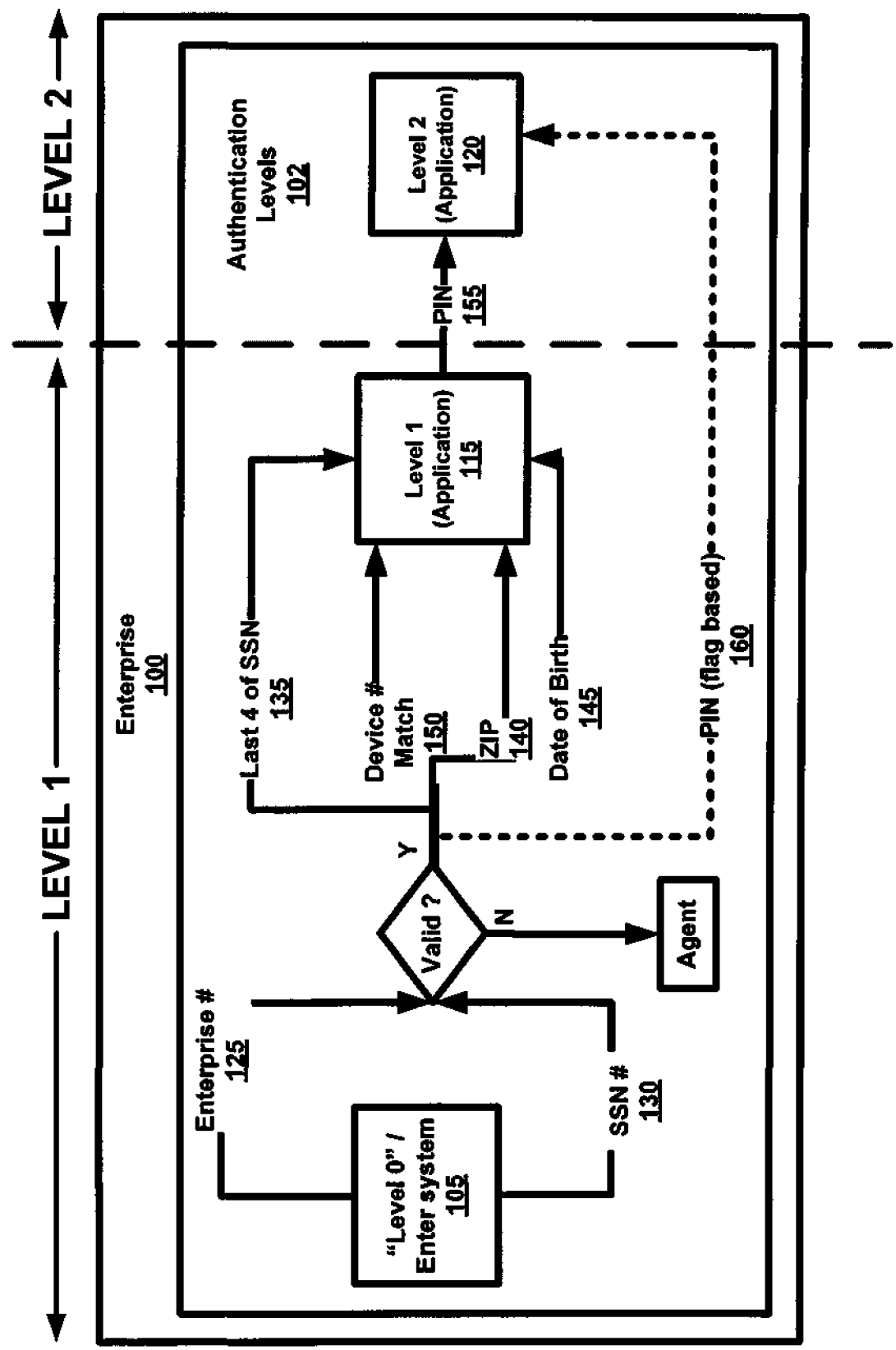
FIG. 2 provides an overview showing how users may navigate between various authentication levels in an enterprise using various authentication mechanisms.

FIG. 2 illustrates a general overview of one aspect of the presently disclosed subject matter, showing how users may navigate between various levels of an enterprise using various authentication mechanisms. FIG. 2 shows an aspect when an enterprise has two access levels. If the user wants to engage in a transaction with the enterprise 100, that user may enter level 0 105 in a variety of ways (it should be noted that levels can contain sublevels, such herein "level 0" 105 can be a subset of level 1 115). For example, the user may provide to an enterprise a number 125 that the user was previously given, or alternatively, the user may provide his or her social security number (SSN) 130. (Interestingly, the authentication process of this level 110 does not need to stop here).

For instance, if the user originally provided the enterprise number 125, then to gain access to level 1 115, the user could provide the last four (4) digits of the user's social security number 135. However, if the user originally gave the user's social security number 130 to pass from level 0 105 to level 1 110, then the user could provide the user's date of birth 145. Thus, a particular input at one level may trigger a certain input at another level (e.g. input 125 may trigger input 135; input 130 may trigger input 145).

FIG. 1 implies that if the user gave either the enterprise number 125 or the SSN 130, then either a ZIP code 140 or a device number match mechanism 150 could be used to gain access to an application in level 1 115. This latter mechanism 150 could match the user's device 165 number to the number in the enterprise 100 database, depending on whether the user's device 165 is a telephone (viz. phone number match), a computer (IP number match or email match), or some other matching mechanism (e.g., device GUID match). Lastly, if the user wanted to gain access from level 1 115 to level 2, a PIN number 155 could be used.

In another aspect of the presently disclosed subject matter, following a user's valid input of either the enterprise number 125 or the SSN 130, another expedited way to gain access to level 2 120 is by having a PIN flag set in said enterprise 100 system, where if the flag is "on," users are asked for a PIN input and upon valid input, such users are given access to level 2 120. Conversely, invalid input could result in engaging the other authentication mechanisms 135, 140, 145, 150.

FIG. 1, however, is merely a state diagram description of the presently disclosed subject matter, and these authentication mechanisms 125, 130, 135, 140, 145, 150, 155 provide unique authentication advantages, especially when used in a predetermined temporal and/or an enterprise structure-dependent order and combination. Thus, the remaining FIGS. 2-4 explore various aspects of such advantageous authentication mechanisms. Lastly, FIGS. 5 and 6 explore the various computing media and mechanisms that could be used in conjunction with the aspects discussed in FIGS. 2-4.

It should be noted that the subject matter of the disclosed aspects herein is provided with specificity to meet statutory requirements. However, the Detailed Description itself is not intended to limit the scope of this disclosure. Rather, the inventors have contemplated that the claimed subject matter might also be embodied in other ways, to include different steps or elements similar to the ones described herein, in conjunction with other present or future technologies. Moreover, the description herein of systems, for example, applies also to methods, computer readable media, apparatuses, and the like.

For instance, the temporal aspects of the mechanisms illustrated in FIG. 1 can be considered. For instance, a user may start accessing the enterprise 100 by being asked to first provide the enterprise number 125. If this number is valid, the user may have access to level 1 110. Alternatively, the user may be given, for instance, two chances to provide the correct enterprise number 125. If after two tries no correct number 125 is provided, then the user may be asked to enter the user's SSN 130. Here, the user may be given, say, three chances (this much is a mere implementation detail) to provide the correct SSN 130. If after three tries no correct SSN 130 is provided, the user may remain at level 0 105 and possibly be transferred to an enterprise representative or agent. If either the correct enterprise number 125 or SSN 130 is given, the user may find him or herself on the way to level 1 115.

Next, when a user contacts the enterprise, the user's account code may be checked to see if the user should be declined any further automated service and instead be transferred to an enterprise representative. If the code is valid, the user may continue in the system and may be asked if the user wants to make a payment. If so, the user may be switched to level 2 120, where a PIN code may be necessary in order to enter. If, however, the user does not want to make a payment at this point, a PIN flag may be checked to see if a PIN code has been set by the user. If so, the user may be prompted to enter a PIN 160. If the PIN 160 is valid, the user is transferred to level 2 120. If, on the other hand, the PIN 160 is not valid, after, say, three attempts, the user may remain at level 1 115 (or be transferred to an agent 117).

Next, in one aspect of the presently disclosed subject matter, a query may be made after step 122 in FIG. 2 as to whether a PIN exists—i.e., if the previously discussed flag has not been set. If the PIN exists, the user may be prompted to enter the PIN. Moreover, if a valid PIN is entered, the user may be sent to level 2 120. Upon this act, a query may be made whether this PIN is a temporary PIN; if not, then the user may be transferred to an application at level 1 115. If, however, the PIN is temporary, then it may be changed (per the discussion below). The one result of this aspect is that users may be able to set (via the flags) the level of security of the enterprise (which should be compared to traditional model of the enterprise setting the security level). In other words, the enterprise may have some baseline or default security level, however, here users can set additional security mechanisms, such as PIN number, in order to expedite navigation in an enterprise.

Conversely, if the PIN does not exist, or if the user does not know it, or if it has been entered incorrectly by the user, then a query may be made regarding the device number match 150. If the device number 150 matches the number in the enterprise 100 database, the user may use applications in level 1 115. If no device number 150 match is made, then the user may be prompted to enter a five-digit ZIP code 140. If the user enters a valid ZIP code 140, the user may be switched to the application level 1 115; if a valid ZIP code has not been entered, after, say, three entry attempts, a query may be made as to whether the user originally provided the enterprise number 125.

If the user originally provided the enterprise number 125, then the user may only have to provide the last four digits of the SSN 135. If entry of the last four digits of the SSN 135 is correct, within three attempts, the user may gain access to applications in level 1 115. If this entry is not correct, the user may remain locked out of any applications in level 1 115. On the other hand, if the user originally did not provide the enterprise number 125, then the user may be asked to enter a date of birth 145. If the date of birth 145 is correct, say, within three tries, the user may be transferred to applications in level 1 115; otherwise, the user may remain locked out of any applications in level 1 115.

At this point, assuming the user has provided at least one valid authentication mechanism 125, that user may enter either level 1 via mechanisms 135, 140, 145, 150 or directly level 2 via mechanism 160. This entry may be made via the PIN 155 given after residing at an application in level 1 115 or via PIN 160 (it should be noted that this PIN 155 and the flag-based PIN 160 may or may not be the same PIN). In one aspect of the presently disclose subject matter, after the proper input is provided for mechanism 125 or 130, users' profiling data can be pulled up from a database in the enterprise. This data can be used to make a determination as to which user is contacting the enterprise and how such a user should be treated—or, if this user set up a PIN flag to gain access to other levels in the enterprise. Some of the remaining mechanisms 135, 140, 145, 150 can then be used to actually authenticate users (also, the PIN 160 may be used to give users access to level 2 120 directly).

Figure 3:
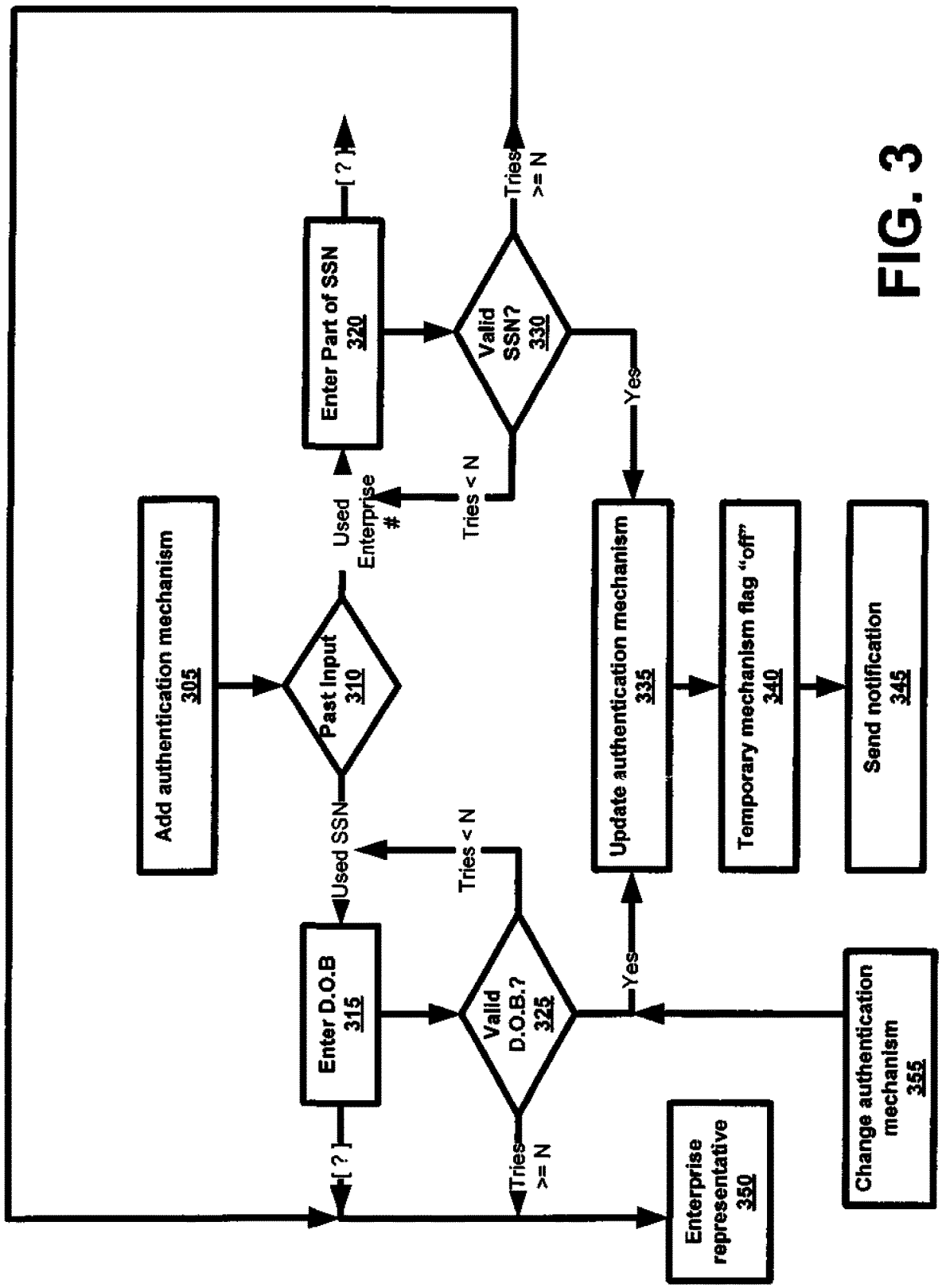
FIG. 3 provides an overview showing how users may change and/or update authentication information.

FIG. 3 illustrates a system for allowing users to modify their authentication information associated with an authentication mechanism (such as the one discussed in FIG. 2). One subsystem of this system (i.e., any computing device discussed below with reference to FIGS. 5 and 6) may receive input from a user regarding either (a) adding an authentication mechanism 305 (e.g., a PIN) and (b) changing the authentication mechanism 355. In the former case, a subsystem may receive a date of birth input 315 when adding the authentication mechanism 305, if a social security number was entered as a past input 310 by the user to access a level within an enterprise. Alternatively, a subsystem may receive at least a part of a social security number input 320 (e.g., the last four digits) when adding the authentication mechanism 305, if an enterprise number was entered as a past input 310 by the user to access a level within the enterprise.

If a valid date of birth 315 is determined 325, an update of the authentication mechanism may be performed 335. Similarly, if a valid part of the social security number is entered, the update of the authentication mechanism may be performed 335. Users may be given a predetermined number of times to try to provide various inputs (say, N number of times), which is implementation dependent and may depend on various enterprise-specific heuristics. After such a limit (N) is reached, the user may be transferred to an enterprise representative 350 (alternatively, if such a user does not know the proper information, as represented by the [?] symbol in FIG. 3, that user may also be transferred to the representative 350).

In any event, once users are able to update the authentication mechanism 335, then upon updating, any temporary authentication mechanism may be turned off 340. Such a temporary mechanism might have been in place before a default mechanism was put in place by the user. Moreover, once the update is complete 335, some other subsystem may provide a notification 345 to the user regarding said updated information. For instance, an email or text message may be sent to the user, reminding the user of the new information for that mechanism.

In the scenario when part of the social security number is used 320, a check can be made 330 for valid input. If the input is made less than N number of times and is valid within those number of times, the update authentication mechanism can be invoked. Otherwise, users may be prompted to speak to enterprise representatives 350.

Figure 4:
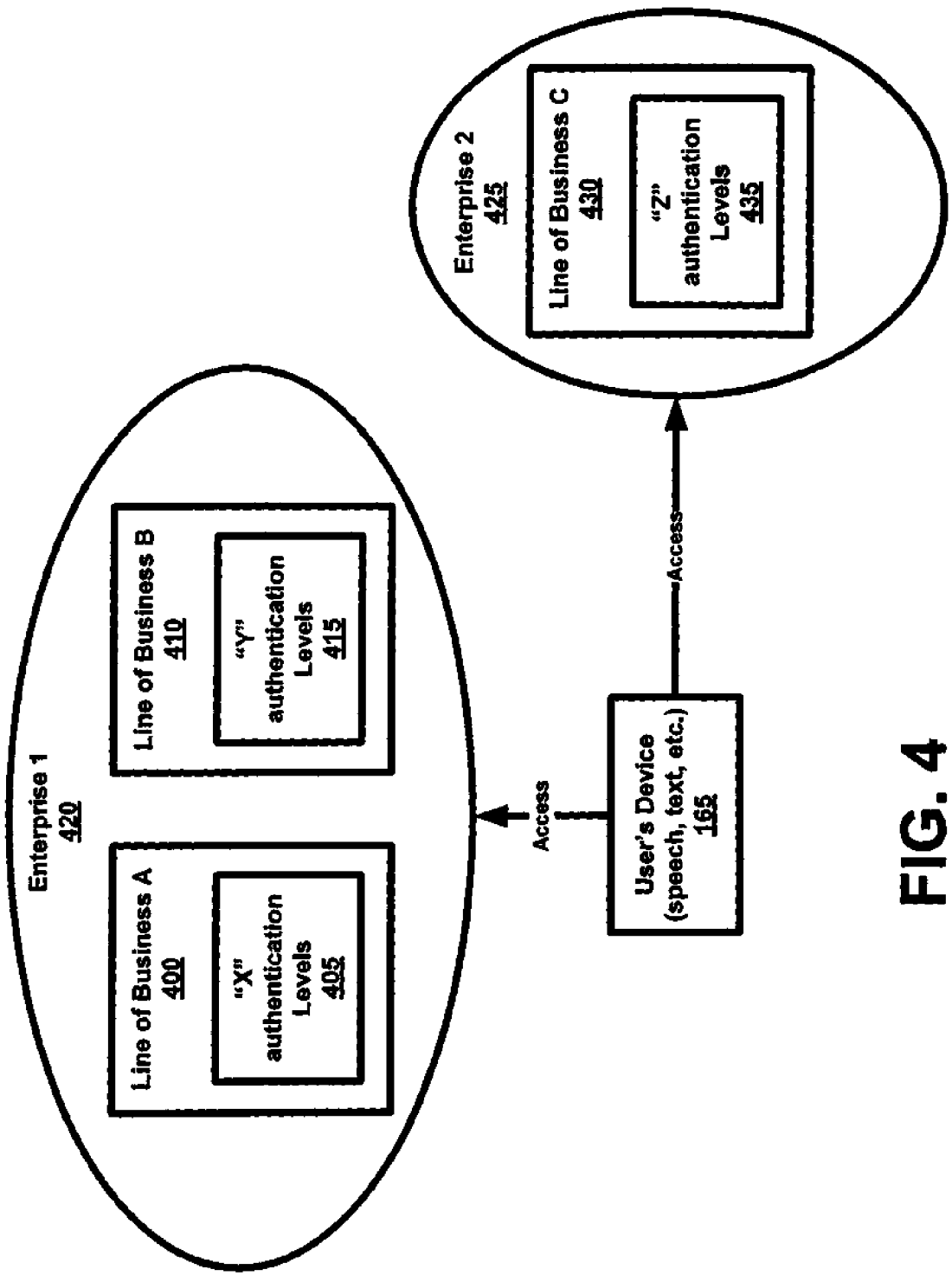
FIG. 4 illustrates the notion that various authentication levels may be used in various lines of business, across various enterprises.

FIG. 4 illustrates the notion that different lines of business in any given enterprise may have different levels of authentication. For example, if enterprise 1 420 is a financial institution that has both a first line of business A 400 (e.g., banking services) and a second line of business B 410 (e.g., insurance services), these lines of business may have different authentication levels 405, 415 for devices through which users are accessing these lines of business 400, 410. However, in other aspects of the presently disclosed subject matter, the authentication levels could be uniform across an entire enterprise. Thus, enterprise 2 425 could have the same authentication level 435 for the entire line of business C 430 and any other lines of other distinct lines of business (not shown).

The systems and subsystems discussed herein may be practiced as methods or may be implemented as computer-executable instructions residing on computer-readable media to practice such methods. As was mentioned above, the various subsystems discussed above could take the form of the various exemplary devices discussed next with reference to FIGS. 5 and 6. Based on various heuristics and empirical studies, these authentication mechanisms, structured in the manner shown with reference to FIGS. 1-4, provide an efficient and secure results for user authentication.

Exemplary Computing and Networking Environment

Figure 5:
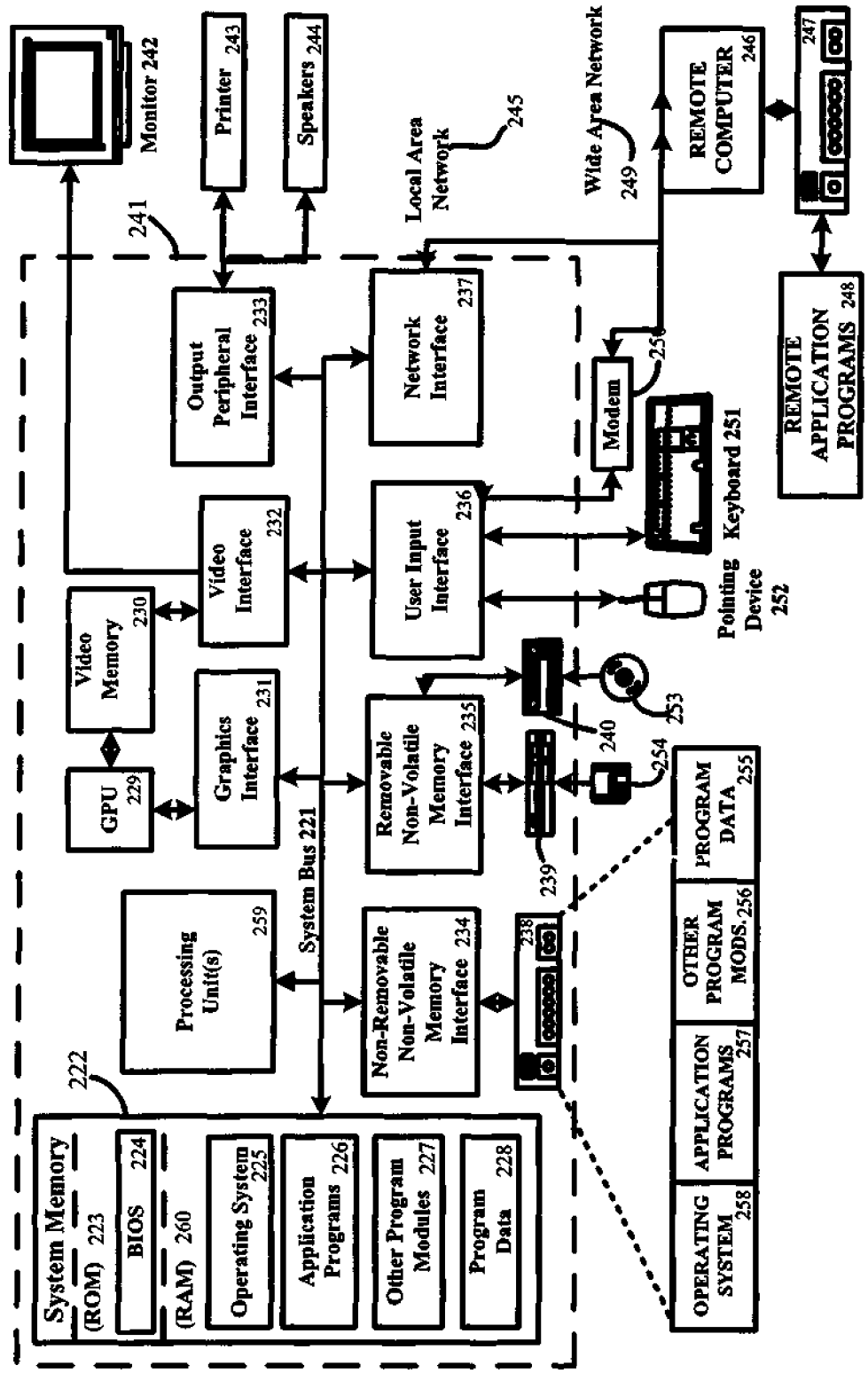
FIG. 5 illustrates exemplary and non-limiting computing devices (and components thereof) that may be used with the aspects disclosed herein.

Referring to FIG. 5, shown is a block diagram representing an exemplary computing device suitable for use in conjunction with implementing the systems, methods, and computer readable media described above. For example, computer-executable instructions are provided that carry out the processes and methods for user authentication. They may reside and/or be executed in such a computing environment 220 as shown in FIG. 5. The computing environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary computing environment 220.

Aspects of the presently disclosed subject matter are operational with numerous other general purpose or special purpose computing systems, environments or configurations. Examples of well known computing systems, environments, and/or configurations that may be suitable for use with the this subject matter include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

Aspects of the presently disclosed subject matter may be implemented in the general context of computer-executable instructions, such as program modules, being executed by a computer. Generally, program modules include routines, programs, objects, components, data structures, etc. that perform particular tasks or implement particular abstract data types. Aspects of the presently disclosed subject matter may also be practiced in distributed computing environments where tasks are performed by remote processing devices that are linked through a communications network. In a distributed computing environment, program modules may be located in both local and remote computer storage media including memory storage devices.

An exemplary system for implementing aspects of the presently disclosed subject matter includes a general purpose computing device in the form of a computer 241. Components of computer 241 may include, but are not limited to, a processing unit 259, a system memory 222, a graphics processing unit 229 (and a graphics interface 231), a video memory 230 (and a video interface 232), and a system bus 221 that couples various system components including the system memory 222 to the processing unit 259. The system bus 221 may be any of several types of bus structures, including a memory bus or memory controller, a peripheral bus, and a local bus using any of a variety of bus architectures. By way of example and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 241 typically includes a variety of computer-readable media. Computer-readable media can be any available media that can be accessed by computer 241, and includes both volatile and nonvolatile media, removable and non-removable media. By way of example and not limitation, computer-readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), electronically erasable programmable read-only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 241.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example and not limitation, FIG. 5 illustrates operating system 225, application programs 226, other program modules 227, and program data 228.

The computer 241 may also include other removable/non-removable, volatile/nonvolatile computer storage media. By way of example only, FIG. 5 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 5 provide storage of computer readable instructions, data structures, program modules and other data for the computer 241. In FIG. 5, for example, hard disk drive 238 is illustrated as storing operating system 258, application programs 257, other program modules 256, and program data 255. Note that these components can be either the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 5. The logical connections depicted in FIG. 5 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example and not limitation, FIG. 5 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs are preferably implemented in a high-level procedural or object-oriented programming language to communicate with a computer system. However, the program(s) can be implemented in assembly or machine language, if desired. In any case, the language may be a compiled or interpreted language, and may be combined with hardware implementations.

Although exemplary embodiments may refer to utilizing aspects of the presently disclosed subject matter in the context of one or more stand-alone computer systems, the said subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 5, the systems and methods provided herein cannot be construed as limited in any way to a particular computing architecture. Instead, the presently disclosed subject matter should not be limited to any single embodiment, but rather should be construed in breadth and scope in accordance with the appended claims.

Figure 6:
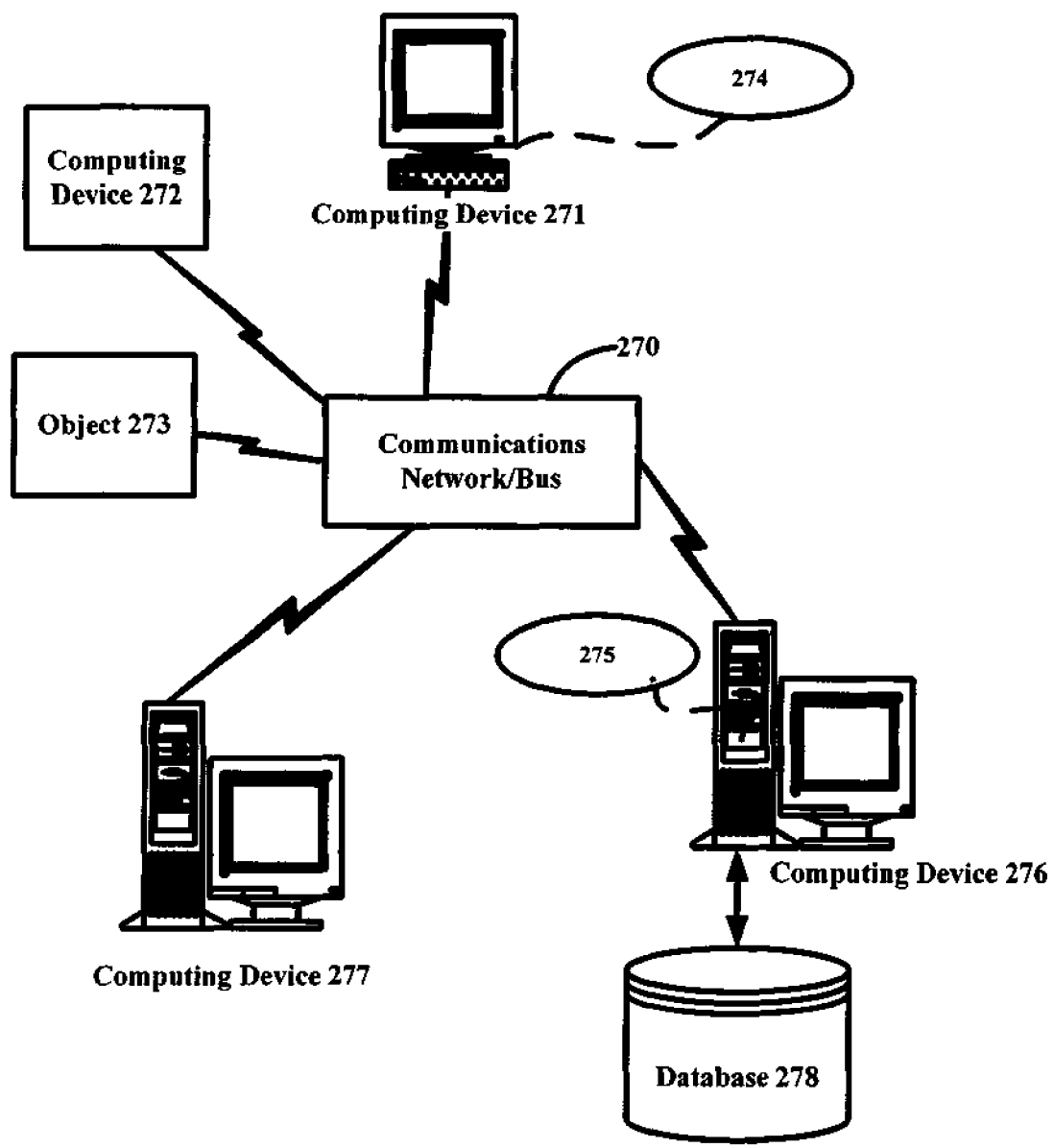
FIG. 6 illustrates exemplary and non-limiting networking devices (and components thereof) that may be used with the aspects disclosed herein.

Referring next to FIG. 6, shown is an exemplary networked computing environment in which many computerized processes may be implemented to perform the processes described above. For example, parallel computing may be part of such a networked environment with various clients on the network of FIG. 6 using and/or implementing the defining and extracting of a flat list of search properties from a rich structured type. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may use the processes described herein.

FIG. 6 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, various entities may be responsible for the maintenance and updating of a database 278 or other storage element.

This network 270 may itself comprise other computing entities that provide services to the system of FIG. 6, and may itself represent multiple interconnected networks. In accordance with an aspect of the presently disclosed subject matter, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 6, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, the two computer systems communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 6 and the further diversification that can occur in computing in a network environment such as that of FIG. 6, the systems, methods and computer readable media provided herein cannot be construed as limited in any way to a particular computing architecture or operating system. Instead, the presently disclosed subject matter should not be limited to any single embodiment, but rather should be construed in breadth and scope in accordance with the appended claims.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, processes and methods were described for user authentication. However, other equivalent mechanisms to these described aspects are also contemplated by the teachings herein. Therefore, the present disclosure should not be limited to any single aspect, but rather construed in breadth and scope in accordance with the appended claims.

What we claim is:

1. A method comprising:
   determining, by a server, a number of inputs required for an electronic device to access data, the number of inputs correlating with authentication requirement of each level within a plurality of security levels;
   receiving, by the server from the electronic device, a first input associated with a first security level;
   upon authenticating the electronic device to access the first security level, receiving, by the server from the electronic device, a second input corresponding to a second security level;
   upon authenticating the electronic device to access the second security level, receiving, by the server from the electronic device, a third input, whereby the server authenticates the electronic device to access the second security level using the third input and without receiving the first input.

2. The method of claim 1, wherein the first, second, or the third input is a unique identifier associated with the electronic device.

3. The method of claim 2, wherein the unique identifier is an IP address.

4. The method of claim 1, wherein the first security level corresponds to a first set of user actions and the second security level corresponds to a second set of user actions, and wherein the second set of user actions is stricter than the first set of user actions.

5. The method of claim 1, wherein the server identifies a pre-determined number of attempts corresponding to the first or the second input.

6. The method of claim 5, wherein the pre-determined number of attempts is determined based on a heuristic algorithm.

7. The method of claim 1, wherein the first security level and the second security level are associated with different types of input.

8. The method of claim 7, wherein the type of input is selected from the group consisting of: an address value associated with a user operating the electronic device, a device identifier, a user identifier, a secret PIN associated with the user, and a date associated with the user.

9. The method of claim 1, wherein when the first or the second input is not correct, the server connects the electronic device to a representative.

10. A computer system comprising:
    an electronic device configured to access data within a plurality of security levels; and
    a server in communication with the electronic device, the server configured to:

determine a number of inputs required for the electronic device to access data, the number of inputs correlating with authentication requirement of each level within a plurality of security levels;

receive, from the electronic device, a first input associated with a first security level;

upon authenticating the electronic device to access the first security level, receive, from the electronic device, a second input corresponding to a second security level;

upon authenticating the electronic device to access the second security level, receive, from the electronic device, a third input, whereby the server authenticates the electronic device to access the second security level using the third input and without receiving the first input.

11. The system of 10, wherein the first, second, or the third input is a unique identifier associated with the electronic device.

12. The system of claim 11, wherein the unique identifier is an IP address.

13. The system of claim 10, wherein the first security level corresponds to a first set of user actions and the second security level corresponds to a second set of user actions, and wherein the second set of user actions is stricter than the first set of user actions.

14. The system of claim 10, wherein the server identifies a pre-determined number of attempts corresponding to the first or the second input.

15. The system of claim 14, wherein the pre-determined number of attempts is determined based on a heuristic algorithm.

16. The system of claim 10, wherein the first security level and the second security level are associated with different types of input.

17. The system of claim 16, wherein the type of input is selected from the group consisting of: an address value associated with a user operating the electronic device, a device identifier, a user identifier, a secret PIN associated with the user, and a date associated with the user.

18. The system of claim 17, wherein when the first or the second input is not correct, the server connects the electronic device to a representative.

* * * * *